Patented Dec. 17, 1929

1,739,772

UNITED STATES PATENT OFFICE

URLYN C. TAINTON, OF KELLOGG, IDAHO

ELECTROLYTIC PRECIPITATION OF METALS

No Drawing.   Application filed January 26, 1926.   Serial No. 83,945.

This invention relates to the electrolytic precipitation of metals from solutions, and is intended more especially for cases in which it is desired to remove a given metal very thoroughly from solution by electrolytic means.

In prior patents of the present applicant (Nos. 1,251,302 and 1,334,419) means are described for the continuous precipitation of metals from solutions in which there is induced rapid motion of the solution relative to a cathode or vice versa. Means are also described for depositing the metal in loose and non-adherent form and for continuously detaching the metal from the cathode and removing it from the cell. The present application describes a further improvement on these methods which is also valuable in securing the precipitation of the last traces of a given metal from the solution.

According to the present invention, this is done by precipitating along with the metal which it is desired to remove another metal which is higher in the electro-chemical scale. For purposes of describing the invention, the metal to be removed will be referred to as metal #1, and the added metal as metal #2. The presence of the second metal allows a double advantage; not only is the deposit rendered looser and more easily detached, but the deposit of deposited mixed metals (Nos. 1 and 2) after detachment possess a higher solution tension than that of the single metal No. 1 which it is desired to remove. Precipitation of this metal No. 1 is therefore effected not only at the cathode itself, but also by the detached cathode deposit of mixed metals, as the metal higher in the electrochemical scale, No. 2, goes back into solution. Since the detached metal from the cathode is usually granular or finely divided and is being rapidly agitated by the movement of the solution in the cell, the precipitation of the metal No. 1 which it is desired to remove is carried out all through the solution instead of only at the cathode face. It thus becomes possible to extract a given metal with extreme rapidity and to a degree of efficiency unequalled in ordinary electrolytic work.

The invention may be used in all cases in which it is desired to effect the precipitation of a metal down to a low concentration. I have found it of especial service in the precipitation of gold and silver from cyanide solutions, the precipitation of lead and silver from chloride solutions (such for example as those described in my other co-pending applications,) and the separation of metals such as copper and cadmium from zinc sulphate solutions intended for the electrolytic extraction of zinc. Other applications will suggest themselves.

As an illustration, I will describe the precipitation of silver from a cyanide solution. If the solution does not already contain a suitable metal higher in the electrochemical scale one must be added to it in the form of a salt. Suitable metals for this purpose are zinc, lead or copper. A very small quantity is usually sufficient. The solution is allowed to flow through a cell such as that described in Patent No. 1,334,419, and a potential is applied to the cathode which is sufficient to bring about the precipitation of the higher metal, say zinc, as well as that of silver.

The conditions are such that the deposited metals are being continually detached and whirled around with the solution. Consequently the zinc-silver deposit continues the precipitation of the silver in solution until all the zinc is redissolved or all the silver is precipitated. In this way the silver may be much more rapidly removed than if it were necessary for all the silver ions to come into actual contact with the cathode as would be the case in ordinary electrolysis.

In order to increase this effect, the detached metal after leaving the cell may be further agitated with the solution (preferably in the absence of air) or the solution carrying the metal in suspension may be filtered through a porous medium such as a filtercloth. In this latter case, the mixed metal deposit continues the precipitation of the silver and the solution after leaving the filter is thoroughly depleted of its silver values.

In the case of the separation of the copper from zinc sulphate solutions, a similar cell is used and a cathode potential is applied sufficient to bring about the precipitation of some zinc at the cathode, along with the copper. The zinc in the deposit, as soon as detached from the cathode, starts to go back into solution precipitating more copper, and this goes on as long as there is any trace of copper left in the solution.

Similarly in the precipitation of lead from chloride solutions a zinc salt if not already present, is introduced into the solution and a sufficiently high cathode potential applied to cause precipitation of zinc which then acts exactly as described above.

It will often happen that a deposit of the required metal obtained in this way is contaminated to some extent by the higher or secondary metal used to assist precipitation. This may however be readily removed by treatment of the deposit with some fresh unprecipitated solution which will redissolve the secondary metal and leave a pure product.

Having thus described my invention, what I claim is:

1. The method of precipitating a given metal from solution, which consists in electrolyzing the solution in the presence of another metal higher in the electrochemical scale and applying a cathode potential sufficiently high to cause deposition of both metals, removing the deposited metals from the cathode and redissolving the metal higher in the electrochemical scale in the solution to liberate and permit precipitation of the given metal.

2. The method of effecting the substantial removal from solution of a given metal or metals, which consists in electrolyzing the solution in the presence of another metal higher in the electrochemical scale than that of the given metal or metals, and applying a cathode potential sufficiently high to cause deposition of the higher metal as well as the lower, detaching the deposited metal from the cathode and bringing it into intimate contact with the solution in such a way that the higher metal may continue the precipitation of the lower metal.

3. The method of effecting the substantial removal from solution of a given metal or metals, which consists in electrolyzing the solution in the presence of another metal higher in the electrochemical scale than that of the given metal or metals, and applying a cathode potential sufficiently high to cause deposition of the higher metal as well as the lower, causing a rapid movement of the solution relative to the cathode or vice versa, whereby the deposited metal is detached and after detachment agitated while in granular or pulverulent form with the solution, in such a way that the higher metal may continue the precipitation of the lower metal.

4. The method of effecting the substantial removal from solution of a given metal or metals, which consists in electrolyzing the solution in the presence of another metal higher in the electrochemical scale than that of the given metal or metals, and applying a cathode potential sufficiently high to cause deposition of the higher metal as well as the lower, causing a rapid movement of the solution relative to the cathode or vice versa, whereby the deposited metal is detached in granular form and after detachment agitated while in granular or pulverulent form with the solution, removing from the cell the solution carrying with it the mixed metals in suspension, and continuing the agitation in a suitable vessel.

5. The method of effecting the substantial removal from solution of a given metal or metals, which consists in electrolyzing the solution in the presence of another metal higher in the electrochemical scale than that of the given metal or metals, and appplying a cathode potential sufficiently high to cause deposition of the higher metal as well as the lower, causing a rapid movement of the solution relative to the cathode or vice versa, whereby the deposited metal is detached in granular form and after detachment agitated while in granular or pulverulent form with the solution, removing from the cell the solution carrying with it the mixed metals in suspension, and filtering the solution through a bed of mixed metal deposit.

6. The method of effecting the substantial removal from solution of a given metal, which consists in adding to the solution a solution of a metal higher in the electrochemical scale electrolyzing the mixed solution and applying a cathode potential sufficiently high to cause deposition of both metals, removing the deposited metals from the cathode and redissolving the higher metal in the solution to liberate and permit precipitation of the given metal.

7. The method of effecting the substantial removal from solution of a given metal, which consists in adding to the solution a solution of a metal higher in the electrochemical scale, electrolyzing the mixed solution and applying a cathode potential sufficiently high to cause deposition of both metals, causing a rapid movement of the solution relative to the cathode, whereby the deposited metal is detached in a granular or pulverulent form, and after detachment agitating the solution while the metal is in a pulverulent form to redissolve the higher metal to precipitate the given metal.

8. The method of effecting the substantial removal from solution of a given metal, which consists in adding to the solution a solution of a metal higher in the electrochemical scale, electrolyzing the mixed solution and applying a cathode potential sufficiently high to cause deposition of both metals, causing a rapid movement of the solution relative to the cathode, whereby the deposited metal is detached in a granular or pulverulent form, removing from the electrolytic cell the solution carrying with it the mixed metals in suspension, and continuing the agitation in a suitable vessel.

9. The method of effecting the substantial removal from solution of a given metal, which consists in adding to the solution a solution of a metal higher in the electrochemical scale, electrolyzing the mixed solution and applying a cathode potential sufficiently high to cause deposition of both metals, causing a rapid movement of the solution relative to the cathode, whereby the deposited metal is detached in a granular or pulverulent form, removing from the electrolytic cell the solution carrying with it the mixed metals in suspension and filtering the solution through a bed of the mixed metal deposit.

URLYN C. TAINTON.